US009285956B2

(12) United States Patent
Kirkpatrick et al.

(10) Patent No.: US 9,285,956 B2
(45) Date of Patent: Mar. 15, 2016

(54) INFORMATION PROCESSING DEVICE, INFORMATION PROCESSING METHOD AND INFORMATION PROCESSING PROGRAM

(71) Applicant: Rakuten, Inc., Shinagawa-ku, Tokyo (JP)

(72) Inventors: Eric Kirkpatrick, Shinagawa-ku (JP); Takia Ogai, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/127,860

(22) PCT Filed: Jan. 24, 2013

(86) PCT No.: PCT/JP2013/051428
§ 371 (c)(1),
(2) Date: Dec. 19, 2013

(87) PCT Pub. No.: WO2014/002517
PCT Pub. Date: Jan. 3, 2014

(65) Prior Publication Data
US 2015/0033158 A1 Jan. 29, 2015

(30) Foreign Application Priority Data

Jun. 29, 2012 (JP) ................................. 2012-147128

(51) Int. Cl.
*G06F 3/0482* (2013.01)
*G06F 3/0488* (2013.01)
(Continued)

(52) U.S. Cl.
CPC ............ *G06F 3/0482* (2013.01); *G06F 3/0486* (2013.01); *G06F 3/0488* (2013.01);
(Continued)

(58) Field of Classification Search
CPC ... G06F 9/4443; G06F 3/0481; G06F 3/0482; G09G 5/14; H04N 5/44591
USPC .......................................................... 715/765
See application file for complete search history.

(56) References Cited

U.S. PATENT DOCUMENTS 5,371,844 A * 12/1994 Andrew et al. ............... 715/747
5,428,734 A * 6/1995 Haynes et al. ................ 715/769
(Continued)

FOREIGN PATENT DOCUMENTS

| JP | 2008-090809 A | 4/2008 |
| JP | 2009230319 A | 10/2009 |
| JP | 2012113435 A | 6/2012 |

OTHER PUBLICATIONS jquery.event.drop (http://web.archive.org/web/20120527205027/http://threedubmedia.com/code/event/drop#properties; dated May 27, 2012; last accessed Dec. 3, 2014.*
(Continued)

*Primary Examiner* — Jung-Mu Chuang
(74) *Attorney, Agent, or Firm* — Sughrue Mion, PLLC

(57) ABSTRACT

An information processing device includes a selection accepting unit that accepts selection of three or more objects among a plurality of displayed objects, a movement control unit that moves one or more objects in accordance with movement of input position related to selection of one or more objects among the selected objects, and a processing execution unit that executes specified processing using information related to the moved object on each of a plurality of fixed objects when a position of the moved object is included in a determination area for the fixed object. Processing on the plurality of fixed objects is thereby executed at a time simply by performing the operation of moving the position of one moved object into the determination area for the fixed object.

8 Claims, 14 Drawing Sheets

(51) Int. Cl.
  *G06F 3/0486* (2013.01)
  *G06F 3/0484* (2013.01)
  *G06F 17/30* (2006.01)
  *G06F 3/0481* (2013.01)

(52) U.S. Cl.
  CPC ........ *G06F3/04817* (2013.01); *G06F 3/04842* (2013.01); *G06F 17/30126* (2013.01); *G06F 2203/04808* (2013.01)

(56) References Cited

U.S. PATENT DOCUMENTS

| | | | | |
|---|---|---|---|---|
| 5,608,860 | A * | 3/1997 | Fitzpatrick et al. | 715/826 |
| 5,638,504 | A * | 6/1997 | Scott et al. | 715/202 |
| 5,659,791 | A * | 8/1997 | Nakajima et al. | 715/202 |
| 5,742,286 | A * | 4/1998 | Kung et al. | 715/839 |
| 5,751,287 | A * | 5/1998 | Hahn | G06F 3/0481 715/775 |
| 5,801,700 | A * | 9/1998 | Ferguson | 715/748 |
| 6,246,411 | B1 * | 6/2001 | Strauss | 715/863 |
| 6,377,288 | B1 * | 4/2002 | Moran et al. | 715/863 |
| 7,019,743 | B1 * | 3/2006 | Wainwright et al. | 345/420 |
| 7,337,409 | B2 | 2/2008 | Doblmayr et al. | 715/769 |
| 7,434,170 | B2 * | 10/2008 | Novak et al. | 715/764 |
| 7,665,028 | B2 * | 2/2010 | Cummins et al. | 715/769 |
| 7,761,427 | B2 * | 7/2010 | Martin et al. | 707/661 |
| 7,840,619 | B2 * | 11/2010 | Horn | 707/829 |
| 8,255,818 | B2 * | 8/2012 | Bales et al. | 715/769 |
| 8,793,605 | B2 * | 7/2014 | Szeto | 715/769 |
| 8,793,606 | B2 * | 7/2014 | Kim | 715/769 |
| 2003/0142123 | A1 * | 7/2003 | Malamud et al. | 345/715 |
| 2005/0131902 | A1 * | 6/2005 | Saika | 707/10 |
| 2005/0222971 | A1 * | 10/2005 | Cary | 707/1 |
| 2005/0246352 | A1 * | 11/2005 | Moore et al. | 707/100 |
| 2007/0027929 | A1 * | 2/2007 | Whelan | G06F 17/30126 |
| 2009/0106680 | A1 * | 4/2009 | Brownholtz et al. | 715/769 |
| 2009/0158186 | A1 * | 6/2009 | Bonev et al. | 715/769 |
| 2009/0237363 | A1 * | 9/2009 | Levy et al. | 345/173 |
| 2009/0237730 | A1 | 9/2009 | Tokunaga et al. | |
| 2009/0259959 | A1 * | 10/2009 | Grotjohn et al. | 715/769 |
| 2009/0296723 | A1 * | 12/2009 | Chang | H04L 12/4625 370/401 |
| 2010/0017734 | A1 * | 1/2010 | Cummins et al. | 715/769 |
| 2010/0269056 | A1 | 10/2010 | Fujita et al. | |
| 2010/0275144 | A1 * | 10/2010 | Dejoras et al. | 715/769 |
| 2011/0035691 | A1 * | 2/2011 | Kim | 715/765 |
| 2012/0084688 | A1 * | 4/2012 | Robert | G06F 3/04817 715/769 |
| 2013/0055127 | A1 * | 2/2013 | Saito et al. | 715/769 |
| 2013/0290353 | A1 * | 10/2013 | Matsumoto | G06F 17/30115 707/752 |
| 2015/0261775 | A1 * | 9/2015 | Shin | H04L 67/1097 707/827 |

OTHER PUBLICATIONS

International Search Report for PCT/JP2013/051428 dated Apr. 3, 2013.

Decision of Allowance issued by the Japanese Patent and Trademark Office in Japanese Application No. P2012-147128 dated May 21, 2013.

International Preliminary Report on Patentability and Written Opinion, dated Jan. 8, 2015, issued in corresponding WO International Application No. PCT/JP2013/051428.

* cited by examiner (a)

(b)

(c)

(a)

(b)

(a)

(b)

(a)

(b)

(a)

(b)

(a)

```
FOLDER L ─┬─ FILE K
          ├─ FILE H
          ⋮

FOLDER M ─┬─ FILE K
          ├─ FILE J
          ⋮

FOLDER N ─┬─ FILE H
          ⋮
```

(b)

(a)

(b)

(a)

(b)

(a)

(b)

(a)

(b)

INFORMATION PROCESSING DEVICE, INFORMATION PROCESSING METHOD AND INFORMATION PROCESSING PROGRAM

CROSS REFERENCE TO RELATED APPLICATIONS

This application is a National Stage of International Application No. PCT/JP2013/051428 filed Jan. 24, 2013, claiming priority based on Japanese Patent Application No. 2012-147128 filed Jun. 29, 2012, the contents of all of which are incorporated herein by reference in their entirety.

TECHNICAL FIELD

The present invention relates to an information processing device, an information processing method and an information processing program.

BACKGROUND ART

A technique that copies a file to a folder by a drag-and-drop operation that moves an icon representing the file or the like onto an icon representing the folder is known. Further, a technique that moves an object representing data by drag and drops it onto an HTML object on a web page and thereby stores the data represented by the object into a storage means that is associated with the HTML is known (see Patent Literature 1, for example).

CITATION LIST

Patent Literature

PTL 1: Japanese Unexamined Patent Application Publication No. 2008-90809

SUMMARY OF INVENTION

Technical Problem

In the above-described techniques, in the case where a file or the like is to be copied to a plurality of locations, it is necessary to repeat drag-and-drop of an object such as an icon representing the file onto an object to which the file is to be copied for the number of the locations, which requires effort for such an operation.

In view of the foregoing, an object of the present invention is to reduce the number of operations at the time of executing processing on a plurality of objects by a drag-and-drop operation.

Solution to Problem

To solve the above problem, an information processing device according to one aspect of the invention is an information processing device including a display means configured to display an image containing a plurality of objects and a detection means configured to be able to detect input from a user indicating a position on the display means and formed integrally with the display means, the device including a selection accepting means configured to accept selection of three or more objects based on input by a user detected by the detection means, a movement control means configured to move one or more objects in accordance with selection of the one or more objects among the objects for which selection is accepted by the selection accepting means and movement of an input position related to selection of the objects, and a processing execution means configured to, when a position of one moved object among the one or more moved objects moved by the movement control means is included in a determination area set based on positions of a plurality of fixed objects not moved by the movement control means among the objects for which selection is accepted by the selection accepting means as a result of movement of the object by the movement control means, execute specified processing on each of the plurality of fixed objects using information related to the moved object.

An information processing method according to one aspect of the invention is an information processing method in an information processing device including a display means configured to display an image containing a plurality of objects and a detection means configured to be able to detect input from a user indicating a position on the display means and formed integrally with the display means, the method including a selection accepting step of accepting selection of three or more objects based on input by a user detected by the detection means, a movement control step of moving one or more objects in accordance with selection of the one or more objects among the objects for which selection is accepted in the selection accepting step and movement of an input position related to selection of the objects, and a processing execution step of, when a position of one moved object among the one or more moved objects moved in the movement control step is included in a determination area set based on positions of a plurality of fixed objects not moved in the movement control step among the objects for which selection is accepted by the selection accepting means as a result of movement of the object in the movement control step, executing specified processing on each of the plurality of fixed objects using information related to the moved object.

An information processing program according to one aspect of the invention is an information processing program in an information processing device including a display means configured to display an image containing a plurality of objects and a detection means configured to be able to detect input from a user indicating a position on the display means and formed integrally with the display means, the program causing a computer to implement a selection accepting function to accept selection of three or more objects based on input by a user detected by the detection means, a movement control function to move one or more objects in accordance with selection of the one or more objects among the objects for which selection is accepted by the selection accepting function and movement of an input position related to selection of the objects, and a processing execution function to, when a position of one moved object among the one or more moved objects moved by the movement control function is included in a determination area set based on positions of a plurality of fixed objects not moved by the movement control function among the objects for which selection is accepted by the selection accepting function as a result of movement of the object by the movement control function, execute specified processing on each of the plurality of fixed objects using information related to the moved object.

According to the above aspect, because specified processing using information related to a moved object is performed on each of a plurality of fixed objects when fixed objects that are not moved among selected objects are recognized as objects to be processed and the position of a moved object that is moved is included in a determination area for the fixed object, processing on the plurality of fixed objects is executed at a time simply by performing the operation of moving the position of one moved object into the determination area for the fixed object. There is thus no need for the same number of operations as the number of objects to be processed, thereby reducing the number of operations in processing on a plurality of objects.

In the information processing device according to another aspect, the processing execution means executes the specified processing when the input position related to selection of the moved object that has been detected in the determination area becomes not detected in the determination area without detection of movement of the input position out of the determination area.

According to the above aspect, it is possible to prevent that specified processing is executed when the position of a moved object merely passes through the determination area for a fixed object at the time of moving the moved object. Accordingly, when processing needs to be canceled after movement of an object has started so as to execute specified processing, the processing can be cancelled by releasing the selection of the moved object outside the determination area.

In the information processing device according to another aspect, the processing execution means displays information related to the moved object in association with each of the plurality of fixed objects displayed on the display means after the position of the one moved object is included in the determination area for the fixed object and before executing the specified processing.

According to the above aspect, it is possible to let a user easily recognize an association between an object having information to be used for processing and objects to be processed before execution of specified processing on each of a plurality of fixed objects using information related to a moved object. Accordingly, it is easily recognized that processing is executed also on fixed objects other than a fixed object having a determination area to which the moved object is moved.

In the information processing device according to another aspect, when the moved object is identification information identifying a file and the fixed objects are folders capable of storing files, the processing execution means stores the file into each of the plurality of folders as the specified processing.

According to the above aspect, it is possible to perform processing of copying one or more files into a plurality of folders easily with a smaller number of operations.

In the information processing device according to another aspect, when the moved object is identification information identifying a file and the fixed objects are folders capable of storing files, if the file related to the moved object is already stored in the folders related to the fixed objects, the processing execution means deletes the file stored in the folders as the specified processing.

According to the above aspect, it is possible to perform processing of deleting the same type of file stored in each of a plurality of folders easily with a smaller number of operations.

In the information processing device according to another aspect, the processing execution means reflects attribute information related to the moved object on each of the fixed objects as the specified processing.

According to the above aspect, it is possible to perform processing of reflecting attribute information about one or more objects on each of a plurality of objects easily with a smaller number of operations.

In the information processing device according to another aspect, the processing execution means causes the display means to display a plurality of attribute information of the moved object, accepts input of selection of one or more attribute information among the plurality of displayed attribute information by a user, and reflects the selected attribute information on each of the fixed objects before executing the specified processing.

According to the above aspect, it is possible to perform processing of reflecting desired attribute information among a plurality of attribute information of one object on each of a plurality of objects easily with a smaller number of operations.

In the information processing device according to another aspect, a plurality of objects are moved by the movement control means, the plurality of moved objects moved by the movement control means are objects having attribute information related to values, and the processing execution unit executes processing in accordance with an amount of values in the attribute information of the plurality of moved objects on each of fixed objects.

According to the above aspect, it is possible to perform processing of reflecting attribute information on each of a plurality of fixed objects in accordance with the amount of values in the attribute information of each of a plurality of moved objects easily with a smaller number of operations.

Advantageous Effects of Invention

According to one aspect of the present invention, it is possible to reduce the number of operations at the time of executing processing on a plurality of objects by a drag-and-drop operation.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
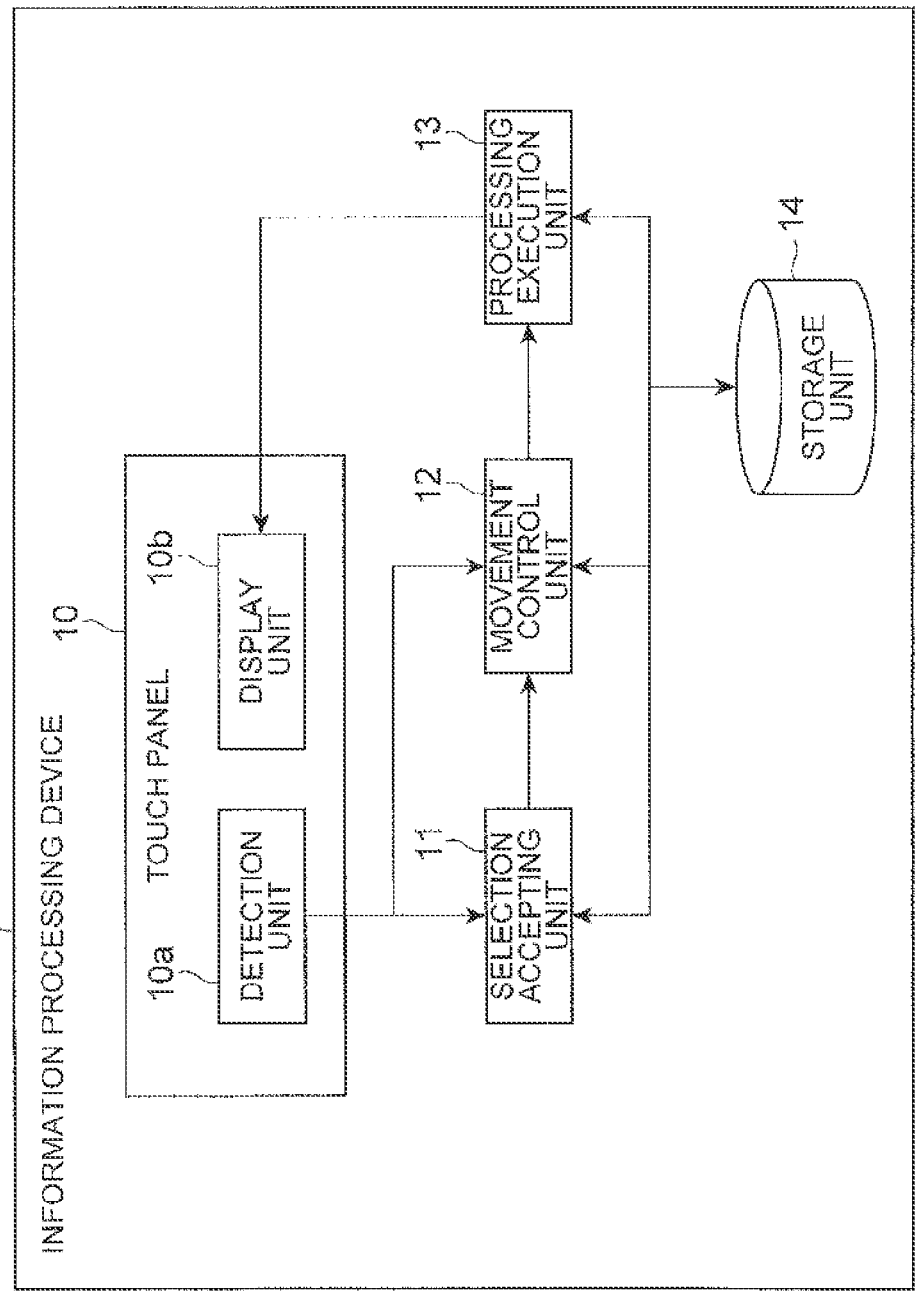
FIG. 1 is a block diagram showing a functional configuration of an information processing device.

FIG. 1 is a block diagram showing a functional configuration of an information processing device 1 according to this embodiment. The information processing device 1 is a device that includes a display means that displays an image including a plurality of objects and a detection means that can detect input from a user indicating a position on the display means and is formed integrally with the display means. The information processing device 1 is a terminal having a so-called touch panel, for example. The touch panel displays an image on a display and is provided with input means that detects physical contact on the display and can thereby detect a position at which physical contact on the display is detected.

The information processing device 1 according to this embodiment is described hereinafter using the example of the terminal having a touch panel 10. As shown in FIG. 1, the information processing device 1 functionally includes a selection accepting unit 11 (selection accepting means), a movement control unit 12 (movement control means), a processing execution unit 13 (processing execution means), and a storage unit 14. The touch panel 10 includes a detection unit 10a and a display unit 10b (display means). The display unit 10b is a device such as a display, for example. Further, the detection unit 10a detects a position at which physical contact on the display by input from a user is detected.

Figure 2:
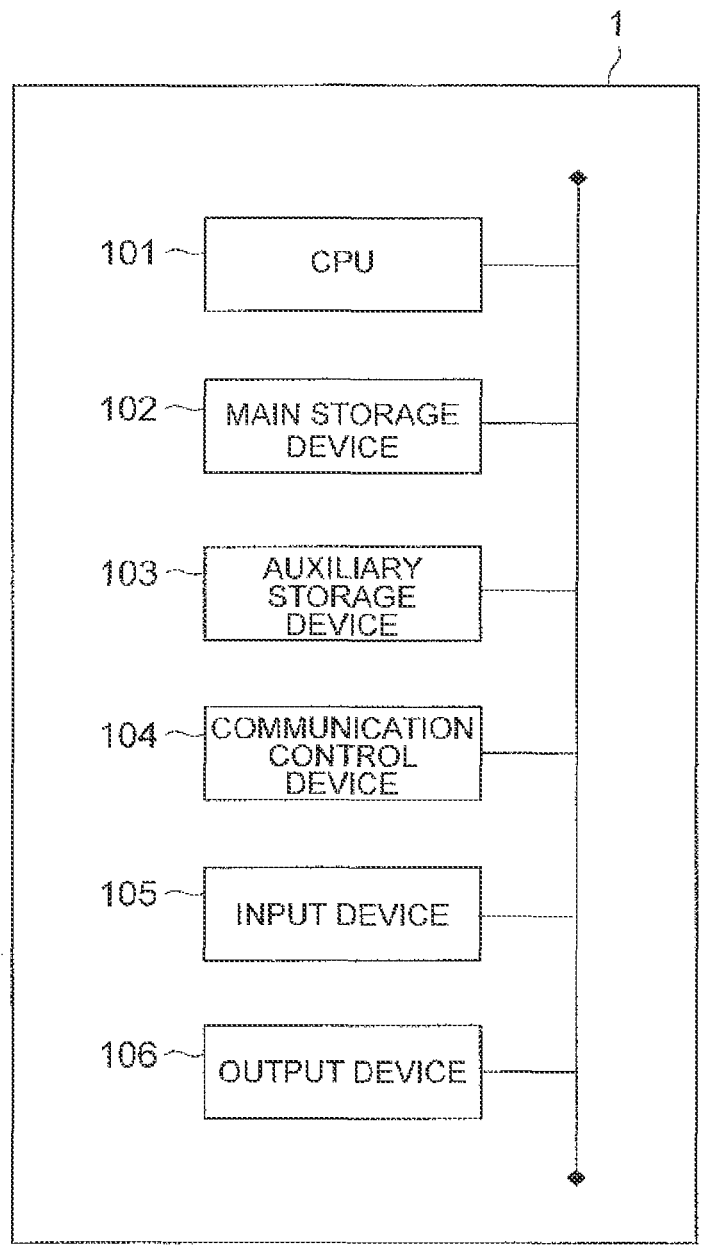
FIG. 2 is a diagram showing a hardware configuration of an information processing device.

FIG. 2 is a hardware configuration diagram of the information processing device 1. The information processing device 1 is physically configured as a computer system that includes a CPU 101, a main storage device 102 such as memory like RAM and ROM, an auxiliary storage device 103 such as a hard disk, a communication control device 104 such as a network card, input device 105 such as a keyboard and a mouse, an output device 106 such as a display and the like.

The functions shown in FIG. 1 are implemented by loading given computer software (information processing program) onto hardware such as the CPU 101 or the main storage device 102 shown in FIG. 2, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

In this embodiment, objects to be processed are an icon representing a file, an application and the like, a set of text, a text box, and a folder or the like capable of storing a file and the like, for example. The objects have a variety of attribute information in accordance with their types, and those attribute information is stored in the storage unit 14 in association with the objects. The attribute information of the objects includes information about an application indicated by the object being an icon, the contents of text of an object being a text box and the like, for example.

The selection accepting unit 11 accepts selection of objects displayed on the display unit 10b based on input by a user that is detected by the detection unit 10a. Because processing is performed on a plurality of objects among selected objects using information related to one or more objects among the selected objects in this embodiment, the selection accepting unit 11 accepts selection of three or more objects. The accepting of selection of objects is described hereinafter with reference to FIG. 3(a).

Figure 3:
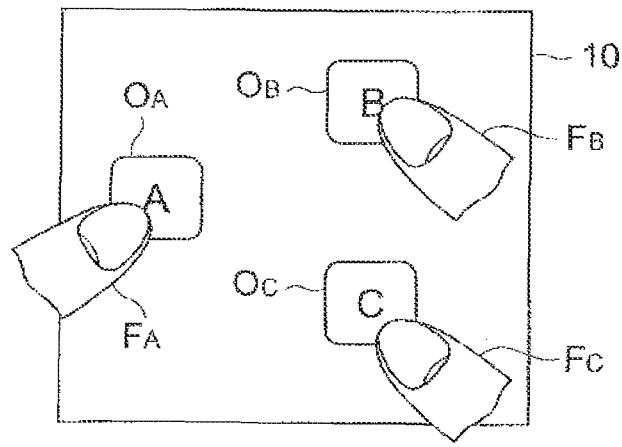
FIG. 3(a) is a diagram showing accepting of selection of an object.
FIG. 3(b) is a diagram showing processing of moving an object.
FIG. 3(c) is a diagram showing an example of a trigger to execute processing.
Figure 3:
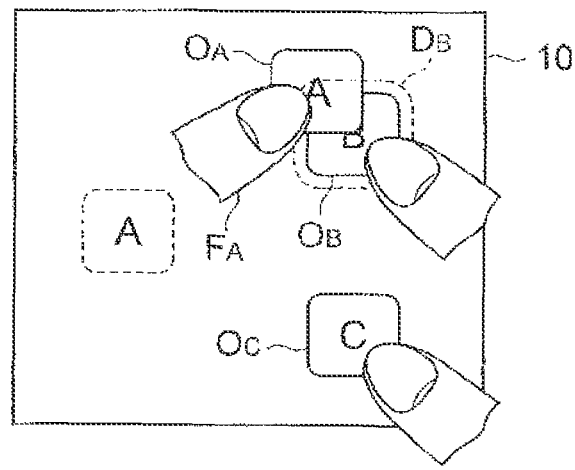
Figure 3:
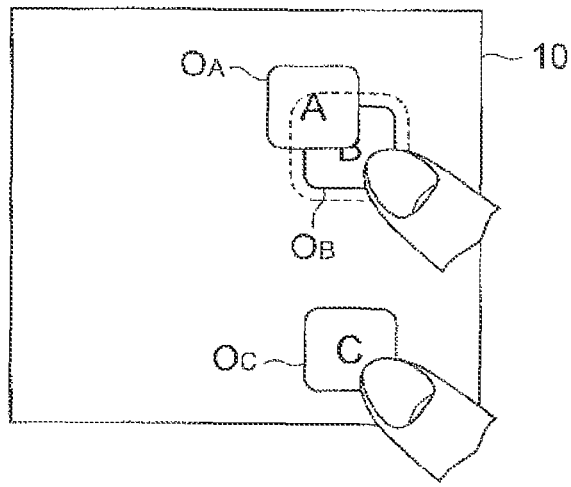

In the example shown in FIG. 3(a), objects $O_A$, $O_B$ and $O_C$ being icons are displayed on the touch panel 10 of the information processing device 1. When physical contact on each of the objects $O_A$, $O_B$ and $O_C$ by user's fingers $F_A$, $F_B$ and $F_C$ are detected by the detection unit 10a, the selection accepting unit 11 accepts selection of the objects $O_A$, $O_B$ and $O_C$. To be specific, the display position and the display area of each of the objects O are stored in the storage unit 14, for example, and therefore the selection accepting unit 11 can accept selection of the objects by acquiring the position information indicating the position of the physical contact by the finger F that is detected by the detection unit 10a and determining whether the acquired position information corresponds to the display area of any of the objects. Note that the selection of objects is accepted by the selection accepting unit 11 not only through physical contact on the display position of an object by a user, and it may be accepted through an operation of enclosing objects to be selected with a trajectory of input positions, an operation of enclosing objects to be selected with a rectangular box having opposing corners at two points of input positions and the like.

The movement control unit 12 is a part that moves one or more objects in accordance with selection of one or more objects among the objects for which selection is accepted by the selection accepting unit 11 and movement of an input position related to the selection of the objects. Movement of objects is described hereinafter with reference to FIG. 3(b).

As shown in FIG. 3(b), upon movement of the input position of the finger $F_A$ after selecting the object $O_A$ and while maintaining the selection of the object, the movement control unit 12 moves the object $O_A$. The movement of the input position of the finger $F_A$ for the object is a so-called a drag-and-drop operation, for example. The object $O_A$ that is moved by the movement control unit 12 is recognized as a moved object in the information processing device 1. On the other hand, the objects $O_B$ and $O_C$ that are not moved among the objects for which selection is accepted by the selection accepting unit 11 are recognized as fixed object in the information processing device 1.

The processing execution unit 13 is a part that, when the position of one moved object among one or more moved objects is included in a determination area that is set based on the positions of a plurality of fixed objects as a result of movement of the object by the movement control unit 12, executes specified processing on each of the plurality of fixed objects using information related to the moved object. The processing execution unit 13 executes specified processing by editing attribute information or the like of each object stored in the storage unit 14, for example. Further, the processing execution unit 13 causes the display unit 10b to display a screen in accordance with a result of specified processing on objects.

The determination area that is set for an object is an area that is set for each of objects in order to determine that the position of another object corresponds to the position of that object. For example, when the position of another object is moved into the determination area by the movement of the input position by the finger and then the contact of the finger on that object is released in the determination area, it is recognized as a so-called drag-and-drop operation. Note that specified processing may be executed by the processing execution unit 13 on condition that the position of a moved object is included in the determination area for a fixed object while maintaining the selection of the fixed object.

In the example shown in FIG. 3(b), the determination area $D_B$ is provided for the object $O_B$, and when the processing execution unit 13 detects that the position of the object $O_A$ that is moved by the movement control unit 12 is included in the determination area $D_B$ for the object $O_B$, it executes specified processing on the objects $O_B$ and $O_C$ using information related to the object $O_A$. The specified processing is described later. Note that the processing execution unit 13 executes specified processing on the objects $O_B$ and $O_C$ using information related to the object $O_A$ also when it detects that the position of the object $O_A$ that is moved by the movement control unit 12 is included in the determination area for the object $O_C$. In other words, the processing execution unit 13 executes specified processing on each of fixed objects when it detects that a moved object is included in the determination area for any of a plurality of fixed objects.

FIG. 3(c) is a diagram showing an example of a trigger to execute processing by the processing execution unit 13. The processing execution unit 13 can execute specified processing when the input position related to selection of a moved object which has been detected in the determination area becomes not detected in the determination area without detection of movement of the input position out of the determination area. As shown in FIG. 3(c), in the case where the position of the object $O_A$ is included in the determination area $D_B$ for the object $O_B$, when the input position for the object $O_A$ becomes not detected by the detection unit 10a without moving the object $O_A$ out of the determination area $D_B$, the processing execution unit 13 executes specified processing on the objects $O_B$ and $O_C$. By executing processing in this manner, it is possible to prevent that specified processing is executed when the position of a moved object merely passes through the determination area for a fixed object at the time of moving the moved object. Accordingly, when processing needs to be canceled after movement of an object has started so as to execute specified processing, the processing can be cancelled by releasing the selection of the moved object outside the determination area.

Figure 4:
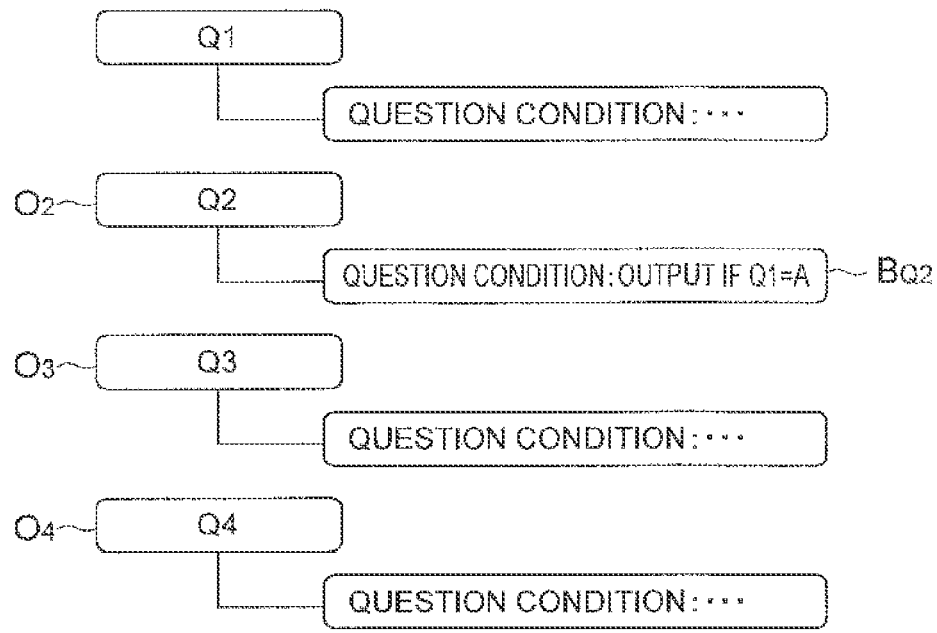
FIG. 4 is a diagram showing an example of processing executed in an information processing device.
Figure 4:
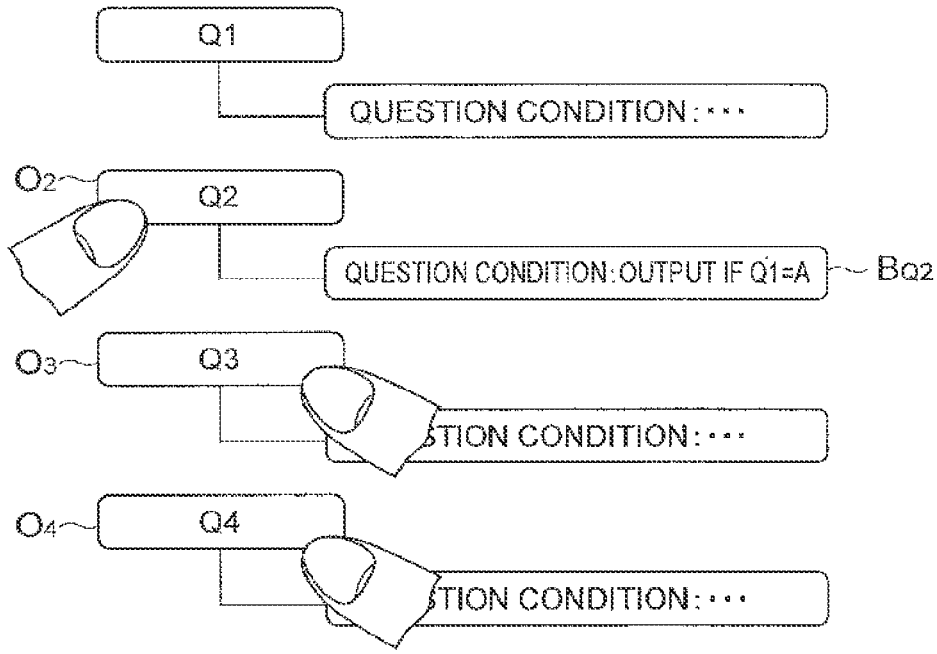
Figure 5:
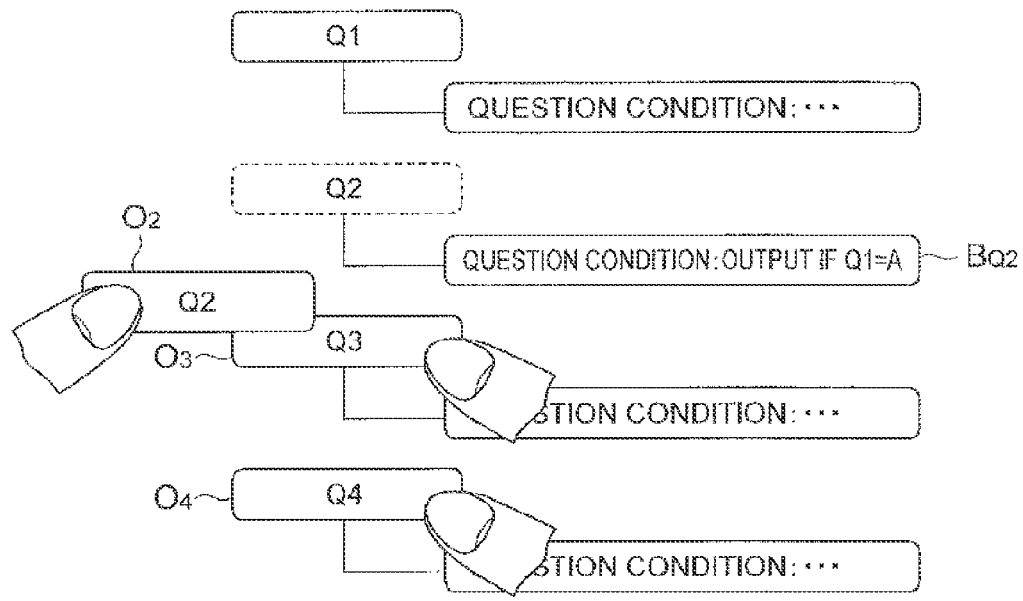
FIG. 5 is a diagram showing an example of processing executed in an information processing device.
Figure 5:
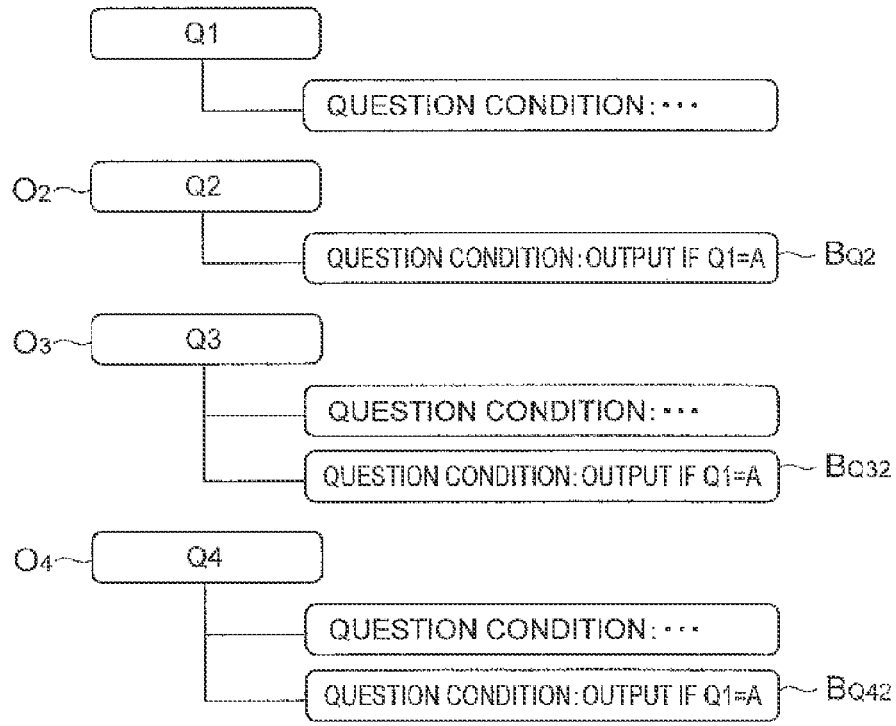

FIGS. 4 and 5 are diagrams showing an example of processing executed in the information processing device 1 according to this embodiment. The example shown in FIGS. 4 and 5 is processing of setting a question condition for each question in an application that creates a questionnaire, for example. FIG. 4(a) shows a screen in the display unit 10b, and the state that a question condition is set for an object representing each question number is displayed on the screen. To be specific, the object $O_2$ of the question Q2 has a question condition $B_{Q2}$ as attribute information. As shown in FIG. 4(b), the selection accepting unit 11 accepts selection of objects $O_2$, $O_3$ and $O_4$ based on input from a user which is detected by the detection unit 10a.

Then, as shown in FIG. 5(a), when the input position selecting the object $O_2$ is moved by the user, the movement control unit 12 moves the object $O_2$ in accordance with movement of the input position. Further, when the processing execution unit 13 detects that the position of the object $O_2$ that is moved by the movement control unit 12 is included in the determination area for the object $O_3$, it executes specified processing on the objects $O_3$ and $O_4$ using information related to the object $O_2$. In the example of this processing, the processing execution unit 13 copies and sets a question condition $B_{Q2}$ that is set as attribute information of the object $O_2$ to the objects $O_3$ and $O_4$ as shown in FIG. 5(b). Thus, the contents of the question condition $B_{Q2}$ are set for each of the questions Q3 and Q4 as question conditions $BQ_{32}$ and $BQ_{42}$, respectively.

Figure 6:
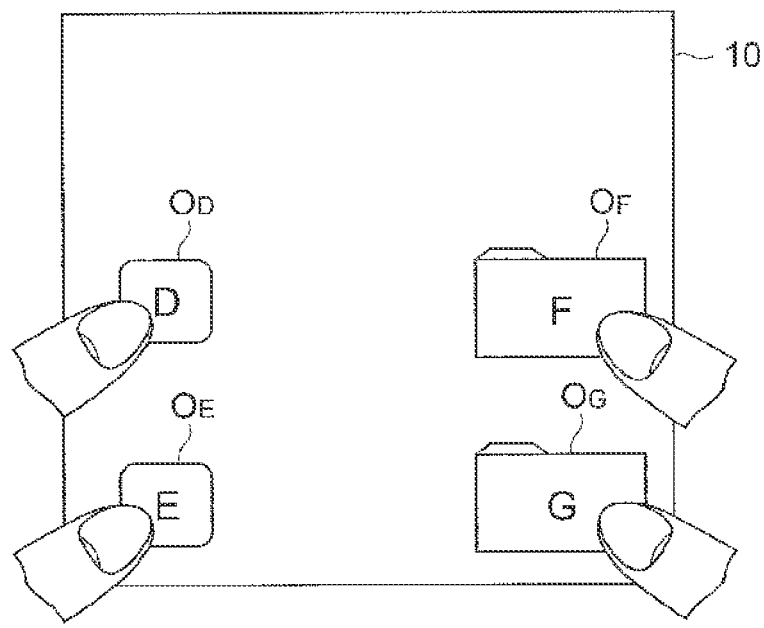
FIG. 6 is a diagram showing another example of processing executed in an information processing device.
Figure 6:
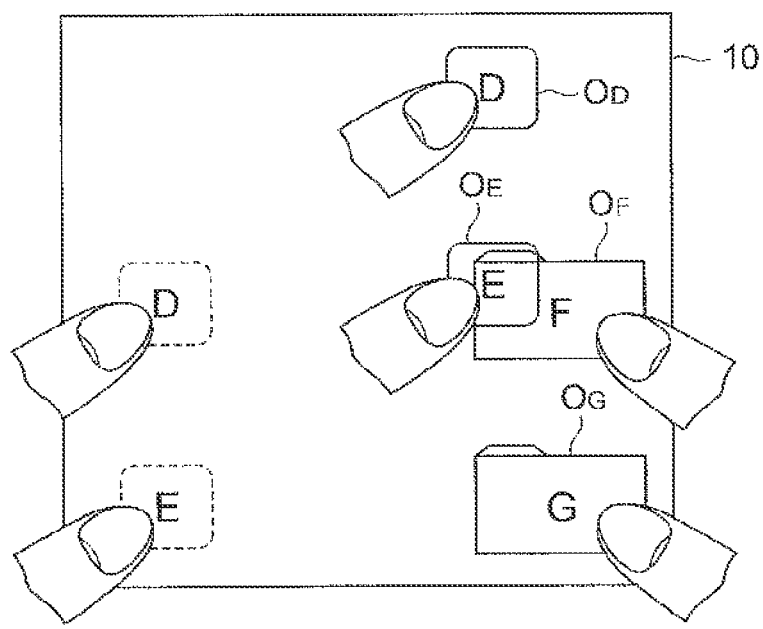
Figure 7:
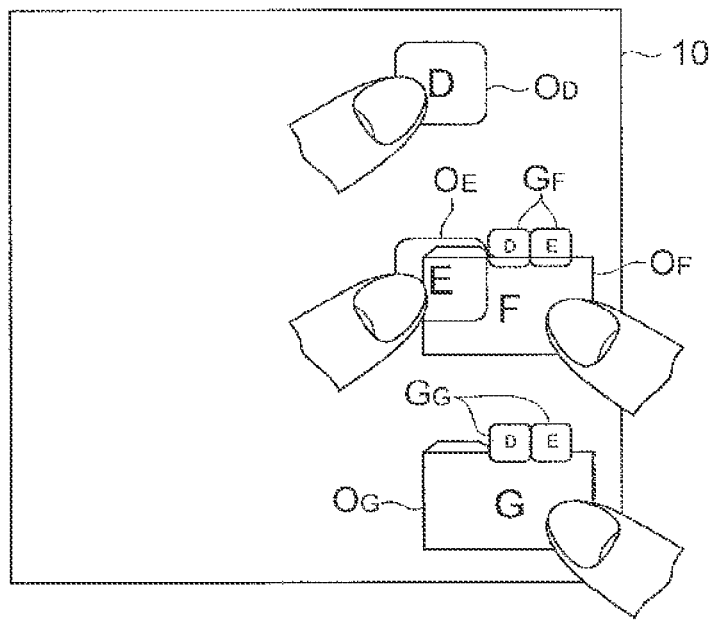
FIG. 7 is a diagram showing another example of processing executed in an information processing device.
Figure 7:
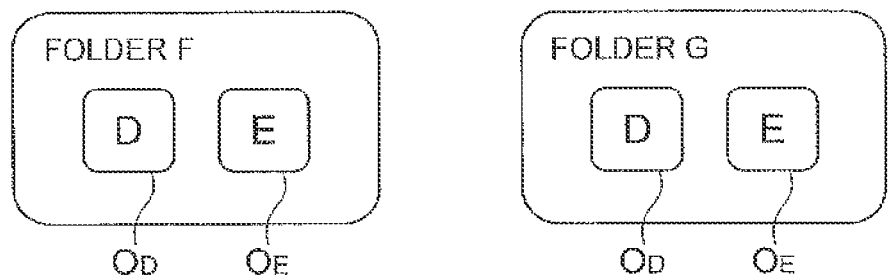

FIGS. 6 and 7 are diagrams showing another example of processing executed in the information processing device 1 according to this embodiment. The example shown in FIGS. 6 and 7 is processing of copying a plurality of files to each of a plurality of folders. FIG. 6(a) shows a screen of the touch panel 10, and objects $O_D$ and $O_E$ that are icons representing files and objects $O_F$ and $O_G$ that are icons representing folders are displayed on the screen. When each of those objects is touched by the user's finger, the selection accepting unit 11 accepts selection of the objects $O_D$, $O_E$, $O_F$ and $O_G$ based on contact by the user which is detected by the detection unit 10a.

Then, as shown in FIG. 6(b), when the input positions selecting the objects $O_D$ and $O_E$ are moved by the user, the movement control unit 12 moves the objects $O_D$ and $O_E$ in accordance with movement of the input positions. Further, when the processing execution unit 13 detects that the position of the object $O_E$ that is moved by the movement control unit 12 is included in the determination area for the object $O_F$, it executes specified processing on the objects $O_F$ and $O_G$ using information related to the objects $O_D$ and $O_E$. Note that, although specified processing is executed when it is detected that the position of the object $O_E$ is included in the determination area for the object $O_F$ in the example of FIG. 6(b), the processing execution unit 13 executes specified processing when it detects that the position of the object $O_E$ is included in the determination area for the object $O_G$ or when it detects that the position of the object $O_D$ is included in the determination area for the object $O_F$ or $O_G$ as well. In other words, the processing execution unit 13 executes specified processing when the position of any of moved objects is included in the determination area for any of a plurality of fixed objects.

Note that the processing execution unit 13 can display information related to a moved object in association with each of a plurality of fixed objects displayed on the display unit 10b after the position of one moved object is included in the determination area for a fixed object and before executing specified processing. To be specific, as shown in FIG. 7(a), the processing execution unit 13 displays guidance $G_F$ indicating that processing using information related to the objects $O_D$ and $O_E$ is to be performed on the object $O_F$ and guidance $G_G$ indicating that processing using information related to the objects $O_D$ and $O_E$ is to be performed on the object $O_G$ in association with the near position of each of the objects $O_D$ and $O_E$. The guidance is displayed after the position of the object $O_E$ is included in the determination area for the object $O_F$ and before processing on the object $O_F$ or $O_G$ using information related to the objects $O_D$ and $O_E$ is performed. Because processing on the objects $O_F$ and $O_G$ is executed when the input position for the object $O_E$ that has been detected becomes not detected, the guidance continues to be displayed during detection of the input position for the object $O_E$. Then, when the input position for the object $O_E$ that has been detected becomes not detected, the display of the guidance is disabled. By making display in this manner, it is possible to let a user easily recognize an association between an object having information to be used for processing and objects to be processed before execution of specified processing on each of a plurality of fixed objects using information related to a moved object. Accordingly, in the case where specified processing is executed by movement of an object as shown in FIG. 6(b), the fact that processing using information related to the objects $O_D$ and $O_E$ is to be performed on the object $O_G$ in the same manner as on the object $O_E$ is easily recognized by the user.

Then, because processing of copying a plurality of files to each of a plurality of folders is executed in the example of this processing, the files D and E are copied to each of the folder F and the folder G by the processing execution unit 13 as shown in FIG. 7(b).

Figure 8:
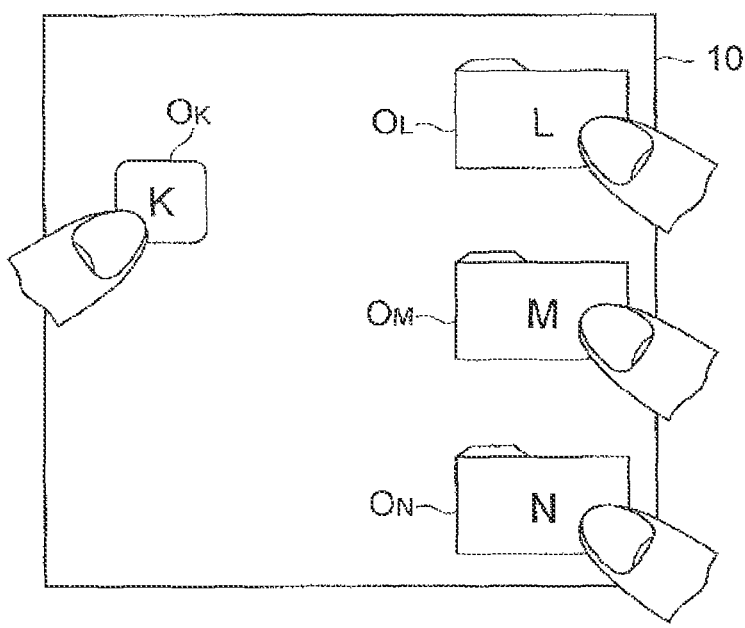
FIG. 8 is a diagram showing another example of processing executed in an information processing device.
Figure 9:
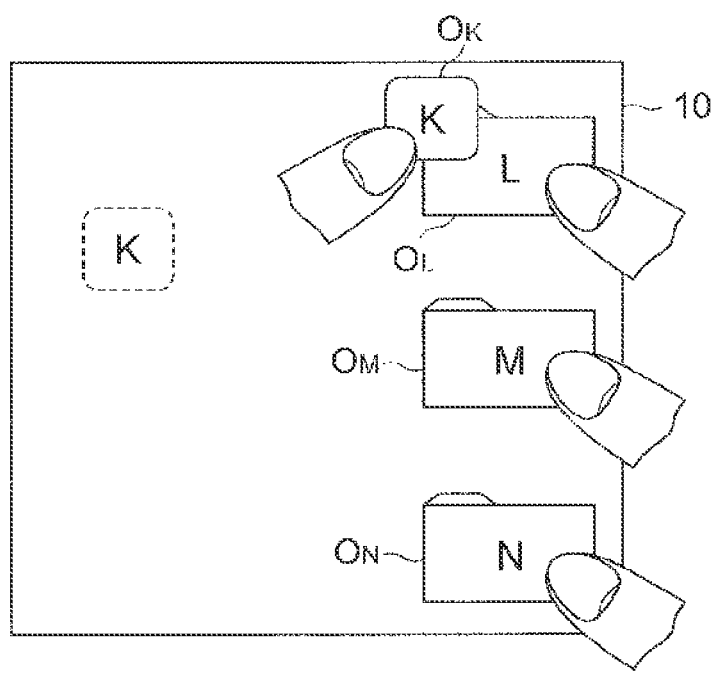
FIG. 9 is a diagram showing another example of processing executed in an information processing device.
Figure 9:
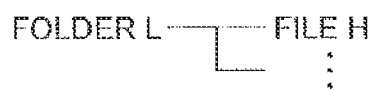
Figure 9:
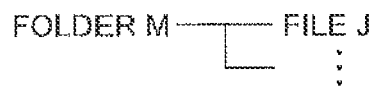
Figure 9:

FIGS. 8 and 9 are diagrams showing another example of processing executed in the information processing device 1 according to this embodiment. The example shown in FIGS. 8 and 9 is processing of deleting files stored in each of a plurality of folders. FIG. 8(a) is a diagram showing files stored in folders L, M and N. As shown in FIG. 8(a), the folder L stores files K and H, the folder M stores files K and J, and the folder N stores the file H. FIG. 8(b) shows a screen of the touch panel 10, and an object $O_K$ that is an icon representing the file K and objects $O_L$, $O_M$ and $O_N$ that are icons representing the folders L, M and N are displayed on the screen. When each of those object is touched by the user's finger, the selection accepting unit 11 accepts selection of the objects $O_K$, $O_L$, $O_M$ and $O_N$ based on contact by the user which is detected by the detection unit 10a.

Then, as shown in FIG. 9(a), when the input position selecting the object $O_K$ is moved by the user, the movement control unit 12 moves the object $O_K$ in accordance with movement of the input position. Further, when the processing execution unit 13 detects that the position of the object $O_K$ that is moved by the movement control unit 12 is included in the determination area for the object $O_L$, it executes specified processing on the objects $O_L$, $O_M$ and $O_N$ using information related to the object $O_K$. Note that, although specified processing is executed when it is detected that the position of the object $O_K$ is included in the determination area for the object $O_L$ in the example of FIG. 9(a), the processing execution unit 13 executes specified processing when it detects that the position of the object $O_K$ is included in the determination area for the object $O_M$ or $O_N$ as well. In other words, the processing execution unit 13 executes specified processing when the position of any of moved objects is included in the determination area for any of a plurality of fixed objects.

When a file related to a moved object is already stored in a folder related to a fixed object, the processing execution unit 13 executes processing of deleting the file stored in the folder as the specified processing. To be specific, when the file K is already stored in the folders L, M and N, the processing execution unit 13 deletes the file K stored in each of the folders. As shown in FIG. 8(a), because the file K is stored in the folder L, the processing execution unit 13 deletes the file K in the folder L as shown in FIG. 9(b). Further, because the file K is stored in the folder M, the processing execution unit 13 deletes the file K in the folder M. Because the file K is not stored in the folder N, the processing execution unit 13 does not execute any processing on the folder N. By executing such processing, it is possible to perform processing of deleting the same type of file stored in each of a plurality of folders easily with a smaller number of operations.

Note that, when a file related to a moved object is not already stored in the folder related to a fixed object, no particular processing is executed on a folder in the example of FIGS. 8 and 9; however, when a file related to a moved object is not already stored in a folder related to a fixed object, the file may be copied to the folder. To be specific, when the file K is not stored in the folder N, the processing execution unit 13 may copy the file K into the folder N.

Figure 10:
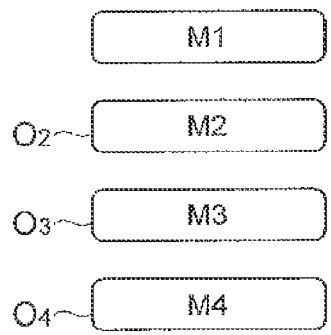
FIG. 10 is a diagram showing another example of processing executed in an information processing device.
Figure 10:
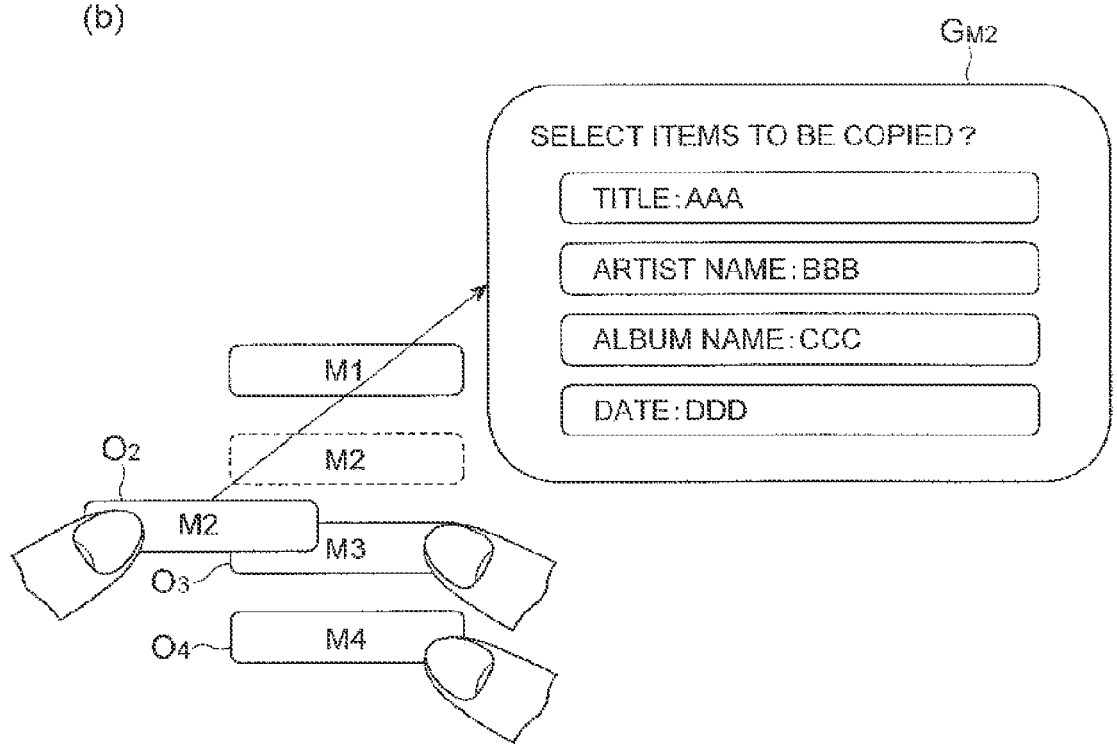

FIG. 10 is a diagram showing another example of processing executed in the information processing device 1 according to this embodiment. The example shown in FIG. 10 is processing of reflecting attribute information of one object on a plurality of other objects. FIG. 10(a) shows a screen of the display unit 10b, and objects representing music files M1 to M4 are displayed on the screen. As shown in FIG. 10(b), the selection accepting unit 11 accepts selection of objects $O_2$, $O_3$ and $O_4$ representing the music files M2 to M4 based on input by a user which is detected by the detection unit 10a. Then, when the input position selecting the object $O_2$ is moved by the user, the movement control unit 12 moves the object $O_2$ in accordance with movement of the input position. Further, when the processing execution unit 13 detects that the position of the object $O_2$ that is moved by the movement control unit 12 is included in the determination area for the object $O_3$, it executes processing of reflecting attribute information of the object $O_2$ on the objects $O_3$ and $O_4$.

In the case where a moved object has a plurality of attribute information to be reflected on fixed objects, the processing execution unit 13 may make the display unit 10b display the plurality of attribute information of the moved object and accept input of selection of one or more attribute information among the plurality of displayed attribute information by a user before executing the processing of reflecting attribute information. Specifically describing with reference to the example of FIG. 10, because the object $O_2$ has a plurality of attribute information $B_{M21}$ to $B_{M24}$ such as a title, an artist name, an album name and date that are associated with the music file, the processing execution unit 13 makes the display unit 10b display guidance $G_{M2}$ including the plurality of attribute information $B_{M21}$ to $B_{M24}$ of the object $O_2$ to let a user select the attribute information to be reflected on the objects $O_3$ and $O_4$. When the processing execution unit 13 accepts input of selection of one or more attribute information among the plurality of displayed attribute information from a user, the processing execution unit 13 reflects the selected attribute information on each of the objects $O_3$ and $O_4$. For example, when the attribute information $B_{M22}$ and $B_{M23}$ are selected by the user, the processing execution unit 13 reflects the artist name and the album name among the attributes of the music file M2 on each of the music files M3 and M4. By executing processing of reflecting attribute information in this manner, it is possible to perform processing of reflecting desired attribute information among a plurality of attribute information of one object on each of a plurality of objects easily with a smaller number of operations.

Figure 11:
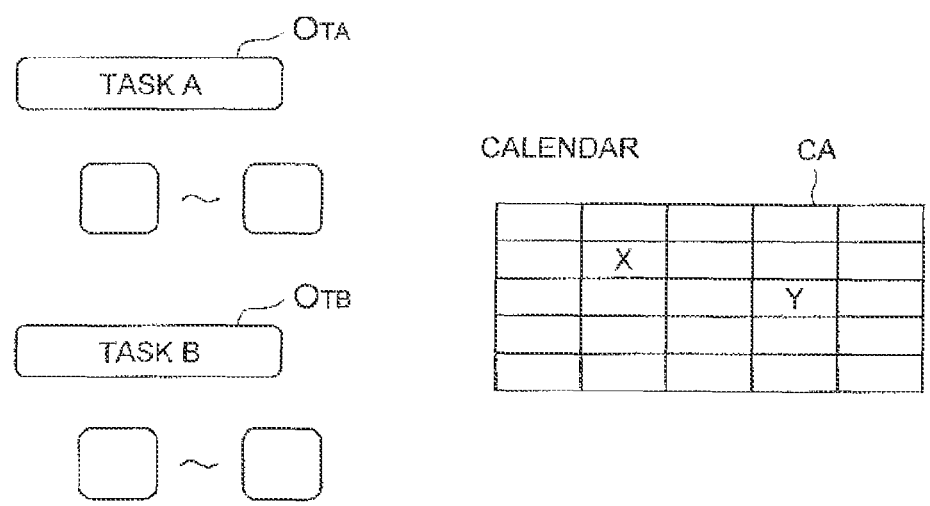
FIG. 11 is a diagram showing another example of processing executed in an information processing device.
Figure 11:
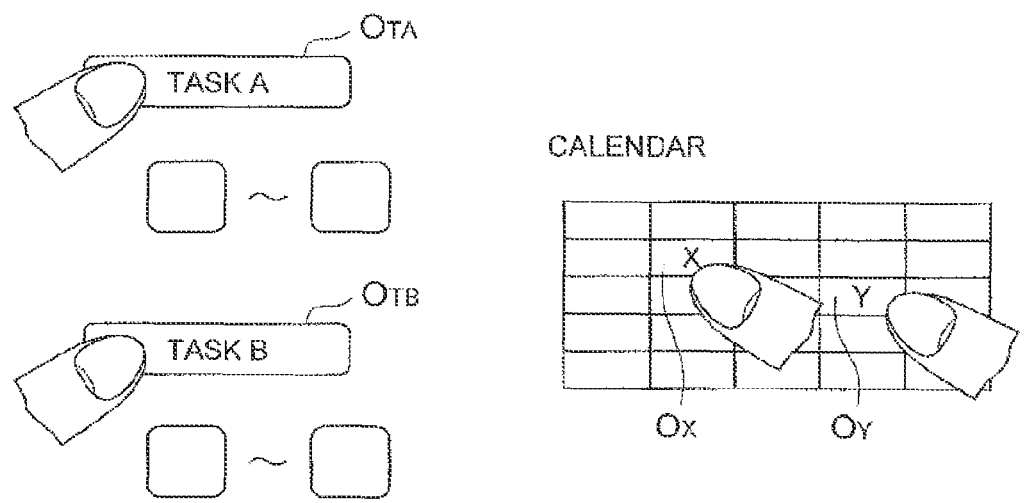
Figure 12:
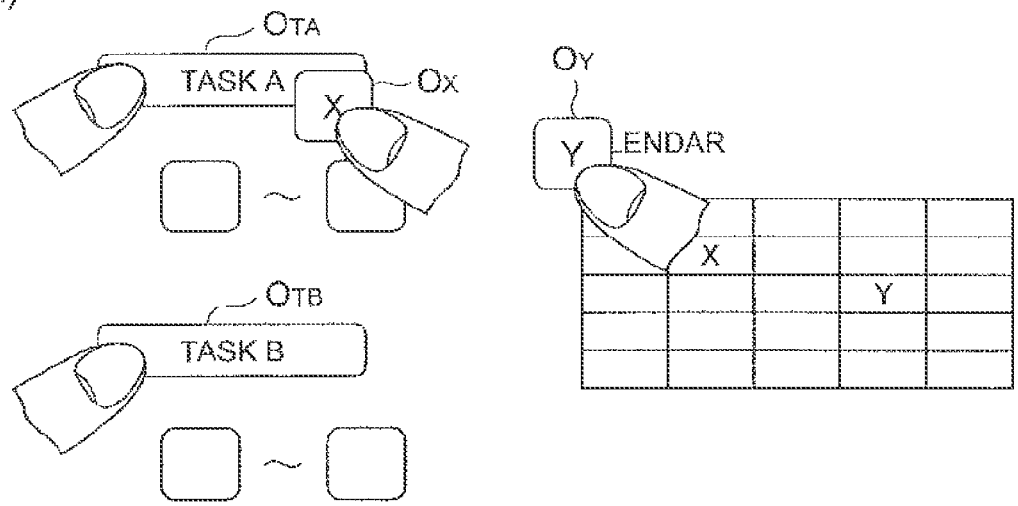
FIG. 12 is a diagram showing another example of processing executed in an information processing device.
Figure 12:
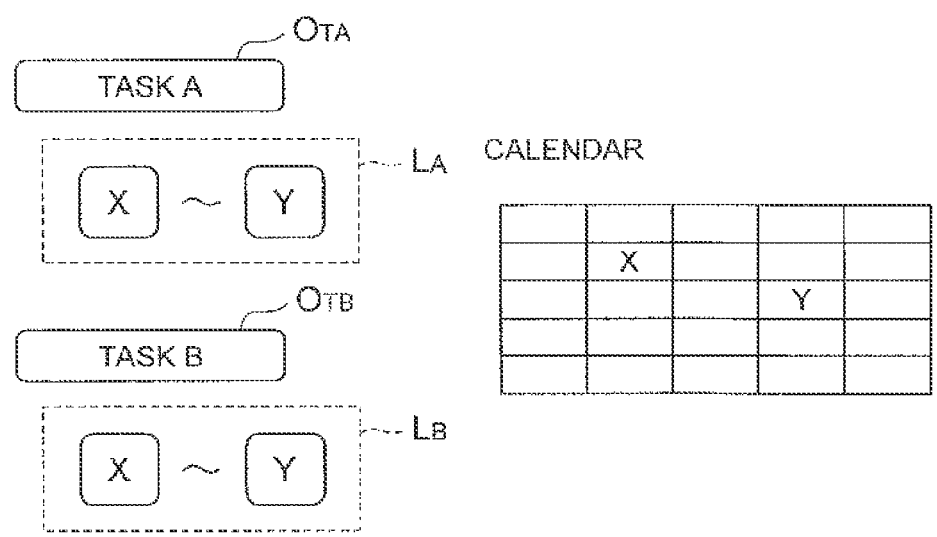

FIGS. 11 and 12 are diagrams showing another example of processing executed in the information processing device 1 according to this embodiment. The example shown in FIGS. 11 and 12 is specified processing that is executed in the case where there are a plurality of moved objects moved by the movement control unit 12 and the moved objects include attribute information having a value. FIG. 11(a) shows a screen for setting a so-called ToDo list that is displayed on the touch panel 10, and objects $O_{TA}$ and $O_{TB}$ that are icons representing tasks A and B and a calendar CA are displayed on the screen. The calendar is configured as a set of objects representing "day". In this screen, the range of date and time for each task is set by the user.

As shown in FIG. 11(b), when the objects $O_{TA}$ and $O_{TB}$ and objects $O_X$ and $O_Y$ representing day X and day Y in the calendar CA are touched by the user's finger, the selection accepting unit 11 accepts selection of the objects $O_{TA}$, $O_{TB}$, $O_X$ and $O_Y$ based on contact by the user which is detected by the detection unit 10a.

Then, as shown in FIG. 12(a), when the input positions selecting the objects $O_X$ and $O_Y$ are moved by the user, the movement control unit 12 moves the objects $O_X$ and $O_Y$ in accordance with movement of the input positions. Further, when the processing execution unit 13 detects that the position of the object $O_X$ that is moved by the movement control unit 12 is included in the determination area for the object $O_{TA}$, it executes specified processing on the objects $O_{TA}$ and $O_{TB}$ using information related to the objects $O_X$ and $O_Y$. Note that, although specified processing is executed when it is detected that the position of the object $O_X$ is included in the determination area for the object $O_{TA}$ in the example of FIG. 12(a), the processing execution unit 13 executes specified processing when it detects that the position of the object $O_X$ is included in the determination area for the object $O_{TB}$ or when it detects that the position of the object $O_Y$ is included in the determination area for the object $O_{TA}$ or $O_{TB}$ as well.

After that, the processing execution unit 13 executes processing in accordance with the amount of values in the attribute information of a plurality of moved objects on each of fixed objects. Specifically describing with reference to FIG. 12(b), the processing execution unit 13 determines that "day X" is smaller than "day Y" regarding the date "day X" and "day Y" represented by the objects $O_X$ and $O_Y$ and sets "day X" as the start date and "day Y" as the end date in each of the ranges $L_A$ and $L_B$ of date and time that are set for the tasks A and B, respectively. By executing the processing in this manner, it is possible to perform processing of reflecting attribute information on each of a plurality of fixed objects in accordance with the amount of values in the attribute information of each of a plurality of moved objects easily with a smaller number of operations.

Figure 13:
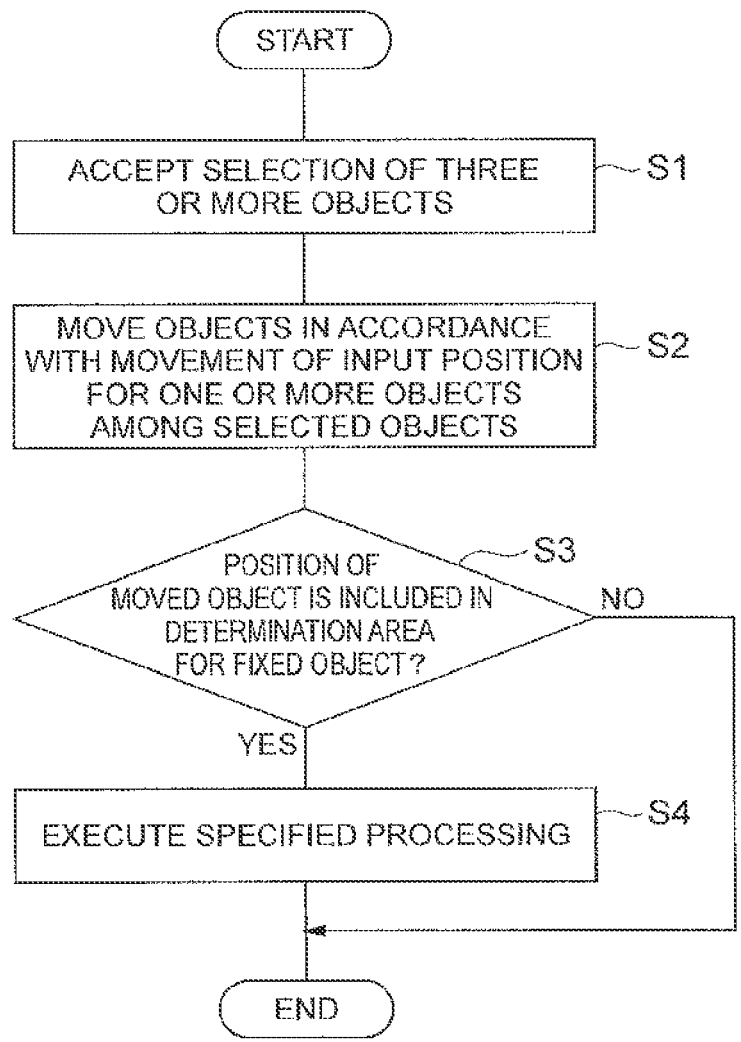
FIG. 13 is a flowchart showing an example of a process of an information processing method.

An information processing method in the information processing device 1 according to this embodiment is described hereinafter with reference to FIG. 13. FIG. 13 is a flowchart showing an example of a process of an information processing method.

First, the selection accepting unit 11 accepts selection of three or more objects among a plurality of objects displayed on the display unit 10b (S1). Next, the movement control unit 12 moves one or more objects in accordance with selection of one or more objects among the objects for which selection is accepted by the selection accepting unit 11 and movement of an input position related to the selection of the objects (S2).

Then, the processing execution unit 13 determines whether the position of one moved object among one or more moved objects is included in a determination area that is set based on the positions of a plurality of fixed objects as a result of movement of the object by the movement control unit 12 (S3). When it is determined that the position of the moved object is included in the determination area for the fixed object, the process proceeds to Step S3. On the other hand, when it is not determined that the position of the moved object is included in the determination area for the fixed object, the process ends.

In Step S4, the processing execution unit 13 executes specified processing on each of a plurality of fixed objects using information related to the moved object (S4).

Figure 14:
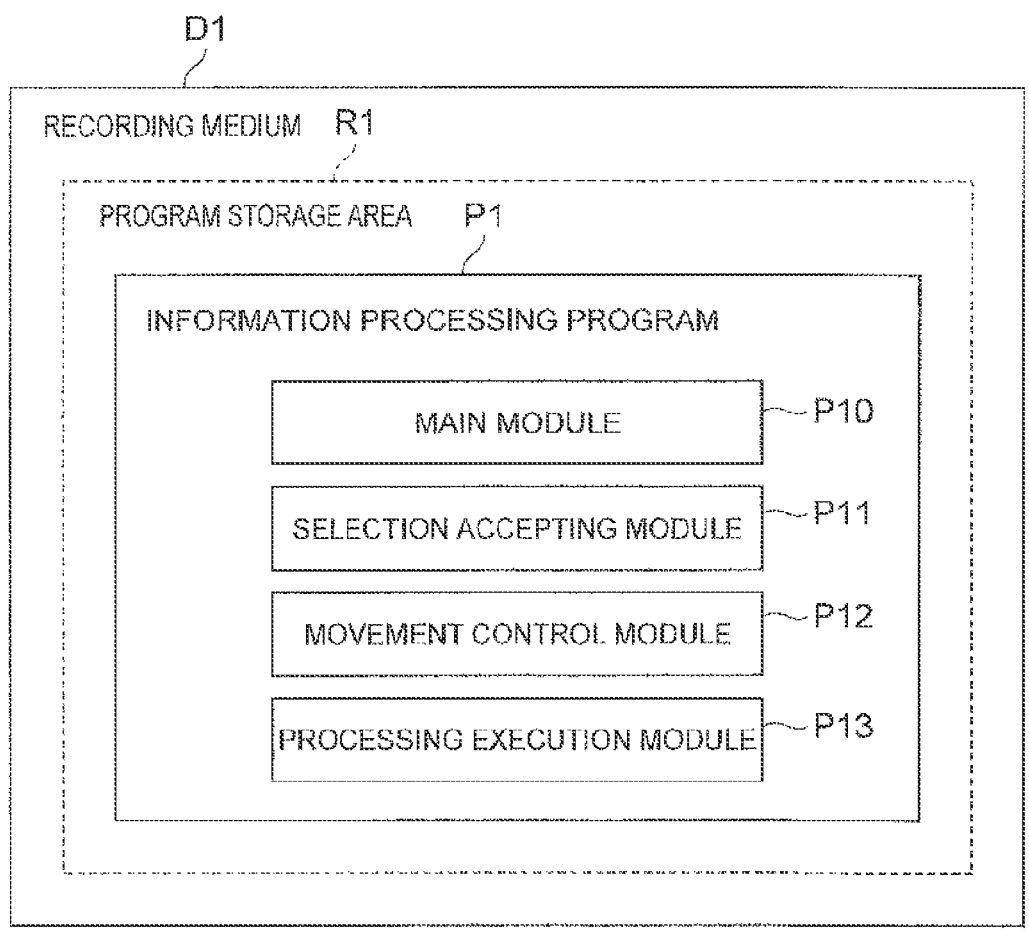
FIG. 14 is a diagram showing a configuration of an information processing program.

An information processing program that causes a computer to function as the information processing device 1 is described hereinafter with reference to FIG. 14. An information processing program P1 includes a main module P10, a selection accepting module P11, a movement control module P12, and a processing execution module P13.

The main module P10 is a part that exercises control over the object processing. The functions implemented by executing the selection accepting module P11, the movement control module P12 and the processing execution module P13 are equal to the functions of the selection accepting unit 11, the movement control unit 12 and the processing execution unit 13 of the information processing device 1 shown in FIG. 1, respectively.

The information processing program P1 is provided through a storage medium such as CD-ROM or DVD-ROM or semiconductor memory, for example. Further, the information processing program P1 may be provided as a computer data signal superimposed onto a carrier wave over a communication network.

According to the information processing device 1, the information processing method and the information processing program P1 described above, because specified processing using information related to a moved object is performed on each of a plurality of fixed objects when fixed objects that are not moved among selected objects are recognized as objects to be processed and the position of a moved object that is moved is included in a determination area for the fixed object, processing on the plurality of fixed objects is executed at a time simply by performing the operation of moving the position of one moved object into the determination area for the fixed object. There is thus no need for the same number of operations as the number of objects to be processed, thereby reducing the number of operations in processing on a plurality of objects.

Hereinbefore, the present invention has been described in detail with respect to the embodiment thereof. However, the present invention is not limited to the above-described embodiment. Various changes and modifications may be made therein without departing from the scope of the invention.

INDUSTRIAL APPLICABILITY

According to the embodiment, it is possible to reduce the number of operations at the time of executing processing on a plurality of objects by a drag-and-drop operation.

REFERENCE SIGNS LIST

1 . . . information processing device, 10 . . . touch panel, 10a . . . detection unit, 10b . . . display unit, 11 . . . selection accepting unit, 12 . . . movement control unit, 13 . . . processing execution unit, 14 . . . storage unit, $D_B$ . . . determination area, D1 . . . storage medium, P1 . . . information processing program, P10 . . . main module, P11 . . . selection accepting module, P12 . . . movement control module, P13 . . . processing execution module

The invention claimed is:

1. An information processing device including:
a display that displays an image containing a plurality of objects;
at least one memory operable to store program instructions;
at least one processor operable to access said memory, read said program instructions, and operate according to said program instructions, said program instructions including:
detection instructions that cause at least one of said at least one processor to detect an input from a user indicating a position on the display;
selection accepting instructions that cause at least one of said at least one processor to accept a selection of three or more objects based on the input by the user detected by the detection instructions;
movement control instructions that cause at least one of said at least one processor to move on said display one or more objects in accordance with a selection of the one or more objects among the three or more objects for which the selection of the one or more objects is accepted by the selection accepting instructions and movement of an input position related to the selected one or more objects, wherein the one or more objects being moved is a subset of the three or more objects, wherein a remaining subset of the three or more objects remains fixed as a plurality of fixed objects, wherein the plurality of fixed objects comprises two or more fixed objects; and
processing execution instructions that cause at least one of said at least one processor to, when a position on the display of one moved object among the one or more moved objects moved by the movement control instructions is included in a determination area of any one of the plurality of fixed objects not moved by the movement control instructions among the three or more objects, execute specified processing on each of the plurality of fixed objects using information related to the moved object, wherein the processing execution instructions cause at least one of said at least one processor to allow the user to select and copy a subset of attribute information associated with the moved object to edit within each of the plurality of fixed objects as the specified processing, without copying the entire moved object to said plurality of fixed objects.

2. The information processing device according to claim 1, wherein
the processing execution instructions cause at least one of said at least one processor to execute the specified processing when the input position related to selection of the moved object that has been detected in the determination area becomes not detected in the determination area without detection of movement of the input position out of the determination area.

3. The information processing device according to claim 1, wherein
instructions cause at least one of said at least one processor to display information on said display related to the moved object in association with each of the plurality of fixed objects displayed on the display after the position of the one moved object is included in the determination area for the fixed object and before executing the specified processing.

4. The information processing device according to claim 1, wherein
when the moved object is identification information identifying a file and the fixed objects are folders capable of storing files, the processing execution instructions cause at least one of said at least one processor to store the file into each of the plurality of folders as the specified processing.

5. The information processing device according to claim 1, wherein
the processing execution instructions cause at least one of said at least one processor to cause the display to display a plurality of attribute information of the moved object, accepts input of selection of one or more attribute information among the plurality of displayed attribute information by a user, and reflects the selected attribute information on each of the fixed objects before executing the specified processing.

6. The information processing device according to claim 1, wherein
a plurality of objects are moved by the movement control instructions,
the plurality of moved objects moved by the movement control instructions are objects having attribute information related to values, and
the processing execution instructions cause at least one of said at least one processor to execute processing in accordance with an amount of values in the attribute information of the plurality of moved objects on each of fixed objects.

7. An information processing device including:
a display that displays an image containing a plurality of objects;
at least one memory operable to store program instructions;
at least one processor operable to access said memory, read said program instructions, and operate according to said program instructions, said program instructions including:
detection instructions that cause at least one of said at least one processor to detect an input from a user indicating a position on the display;
selection accepting instructions that cause at least one of said at least one processor to accept a selection of three or more objects based on the input by the user detected by the detection instructions;
movement control instructions that cause at least one of said at least one processor to move on said display one or more objects in accordance with a selection of the one or more objects among the three or more objects for which the selection the one or more objects is accepted by the selection accepting instructions and movement of an input position related to the selected one or more objects; and
wherein the one or more objects being moved is a subset of the three or more objects, wherein a remaining subset of the three or more objects remains fixed as a plurality of fixed objects, wherein the plurality of fixed objects comprises two or more fixed objects; and
processing execution instructions that cause at least one of said at least one processor to, when a position on the display of one moved object among the one or more moved objects moved by the movement control instruction is included in a determination area of any one of the plurality of fixed objects not moved by the movement control instructions among the three of more objects, execute specified processing on each of the plurality of fixed objects using information related to the moved object,
wherein when the moved object is an identification information identifying a file and the plurality of fixed objects are folders capable of storing files, if the file related to the moved object is already stored in the folders related to the plurality of fixed objects, the processing execution instructions cause at least one of said at least one processor to delete the file stored in the folders as the specified processing, without adding a new copy of said file, to ensure that no copy of said file remains in the folders.

8. An information processing method in an information processing device including at least one processor and a display that displays an image containing a plurality of objects, the method performed by said at least one processor and comprising:
detecting an input from a user indicating a position on the display;
accepting a selection of three or more objects based on the input by the user detected;
moving one or more objects in accordance with a selection of the one or more objects among the three or more objects for which the selection of the one or more objects is accepted and movement of an input position related to the selected one or more of the objects,
wherein the one or more objects being moved is a subset of the three or more objects, wherein a remaining subset of the three or more objects remains fixed as a plurality of fixed objects, wherein the plurality of fixed objects comprises two or more fixed objects,
when a position on the display of one moved object among the one or more moved objects moved by the movement control instructions is included in a determination area of any one of the plurality of fixed objects not moved by the movement control instructions among the three or more objects, execute specified processing on each of the plurality of fixed objects using information related to the moved object, wherein the processing execution instructions cause at least one of said at least one processor to allow the user to select and copy a subset of attribute information associated with the moved object to edit within each of the plurality of fixed objects as the specified processing, without copying an entire attribute information associated with the moved object to said plurality of fixed objects.

* * * * *